(12) United States Patent
Owatari et al.

(10) Patent No.: US 11,136,930 B2
(45) Date of Patent: Oct. 5, 2021

(54) ENGINE START CONTROL DEVICE

(71) Applicant: DENSO CORPORATION, Kariya (JP)

(72) Inventors: Shinya Owatari, Kariya (JP); Shogo Hoshino, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/778,024

(22) Filed: Jan. 31, 2020

(65) Prior Publication Data
US 2020/0165993 A1 May 28, 2020

Related U.S. Application Data

(63) Continuation of application No. PCT/JP2018/027496, filed on Jul. 23, 2018.

(30) Foreign Application Priority Data

Jul. 31, 2017 (JP) .............................. JP2017-147856

(51) Int. Cl.
*F02N 11/00* (2006.01)
*F02N 19/00* (2010.01)
(Continued)

(52) U.S. Cl.
CPC ..... *F02D 41/062* (2013.01); *B60W 30/18018* (2013.01); *B60W 2510/0638* (2013.01);
(Continued)

(58) Field of Classification Search
CPC ... B60W 2510/0638; B60W 2510/0685; F02D 2200/101; F02D 2250/06; F02N 11/0844; F02N 2019/007; F02N 2019/008
(Continued)

(56) References Cited

U.S. PATENT DOCUMENTS 10,294,880 B2 * 5/2019 Takizawa ............ F02N 11/0844
10,724,491 B2 * 7/2020 Namuduri ................. H02P 6/20
(Continued)

FOREIGN PATENT DOCUMENTS

JP 2005-012966 A 1/2005
JP 2007-292079 A 11/2007
(Continued)

OTHER PUBLICATIONS

Oct. 23, 2018 International Search Report issued in International Patent Application No. PCT/JP2018/027496.

*Primary Examiner* — Erick R Solis
(74) *Attorney, Agent, or Firm* — Oliff PLC

(57) ABSTRACT

An engine start control device includes an pass determination section that performs a pass determination process of determining, based on a rotation state of the engine output shaft, whether a piston in a cylinder of the engine can pass over a compression top dead center for a rotation drop period in response to an occurrence of the start request. The engine start control device also includes a start control section that when it is determined that the piston cannot pass over the compression top dead center, starts driving of the motor in a low reaction force period to start the engine, the low reaction force period being a period in which a reaction force applied to the piston by a cylinder internal pressure in the cylinder is a predetermined value or less.

16 Claims, 6 Drawing Sheets

(51) Int. Cl.
*F02D 41/06* (2006.01)
*B60W 30/18* (2012.01)
(52) U.S. Cl.
CPC .............. *B60W 2510/0685* (2013.01); *F02D 2200/101* (2013.01); *F02D 2250/06* (2013.01)
(58) Field of Classification Search
USPC .......................... 701/113; 123/179.3, 179.4
See application file for complete search history.

(56) References Cited

U.S. PATENT DOCUMENTS

| | | | | |
|---|---|---|---|---|
| 2004/0149247 | A1* | 8/2004 | Kataoka | F02N 11/006 123/179.4 |
| 2011/0155085 | A1* | 6/2011 | Hirano | F02N 11/0844 123/179.3 |
| 2014/0107903 | A1* | 4/2014 | Kawazu | F02D 41/0097 701/101 |
| 2014/0326208 | A1* | 11/2014 | Shoda | F02N 11/0833 123/179.4 |
| 2014/0345556 | A1* | 11/2014 | Okabe | F02N 11/101 123/179.16 |
| 2016/0245206 | A1* | 8/2016 | Suzuki | F02N 99/002 |
| 2018/0230957 | A1* | 8/2018 | Kamei | F02D 29/02 |

FOREIGN PATENT DOCUMENTS

| | | | |
|---|---|---|---|
| JP | 2010-077859 | A | 4/2010 |
| JP | 2016-023559 | A | 2/2016 |
| JP | 6031842 | B2 | 11/2016 |

* cited by examiner

ENGINE START CONTROL DEVICE

CROSS-REFERENCE TO RELATED APPLICATION

The present application is a continuation application of International Application No. PCT/JP2018/027496, filed Jul. 23, 2018, which claims priority to Japanese Patent Application No. 2017-147856 filed Jul. 31, 2017. The contents of these applications are incorporated herein by reference in their entirety.

BACKGROUND

Technical Field

The present disclosure relates to an engine start control device.

Background Art

An engine control system having a so-called idle stop function has been conventionally known. The idle stop function detects, for example, operation to stop or start a vehicle such as accelerator operation or brake operation, and automatically stops or automatically restarts an engine. The engine control system aims to achieve an effect such as a reduction in fuel consumption of the engine by the idle stop control.

An engine starting method of restarting an engine by driving a motor generator (rotary electric machine) has been conventionally known.

SUMMARY

In the present disclosure, provided is an engine start control device as the following. The engine start control device includes an pass determination section that performs a pass determination process of determining, based on a rotation state of an engine output shaft, whether a piston in a cylinder of an engine can pass over a compression top dead center for a rotation drop period in response to an occurrence of an start request, the rotation drop period being a period until an engine rotational speed drops to zero after combustion of the engine is stopped; and a start control section that when it is determined that the piston cannot pass over the compression top dead center, starts driving of an motor in a low reaction force period to start the engine, the low reaction force period being a period in which a reaction force applied to the piston by a cylinder internal pressure in the cylinder is a predetermined value or less.

BRIEF DESCRIPTION OF THE DRAWINGS

The above object and other objects, features, and advantages of the present disclosure will be more clarified by the following detailed description with reference to the accompanying drawings, wherein.

DETAILED DESCRIPTION OF THE PREFERRED EMBODIMENTS

Figure 1:
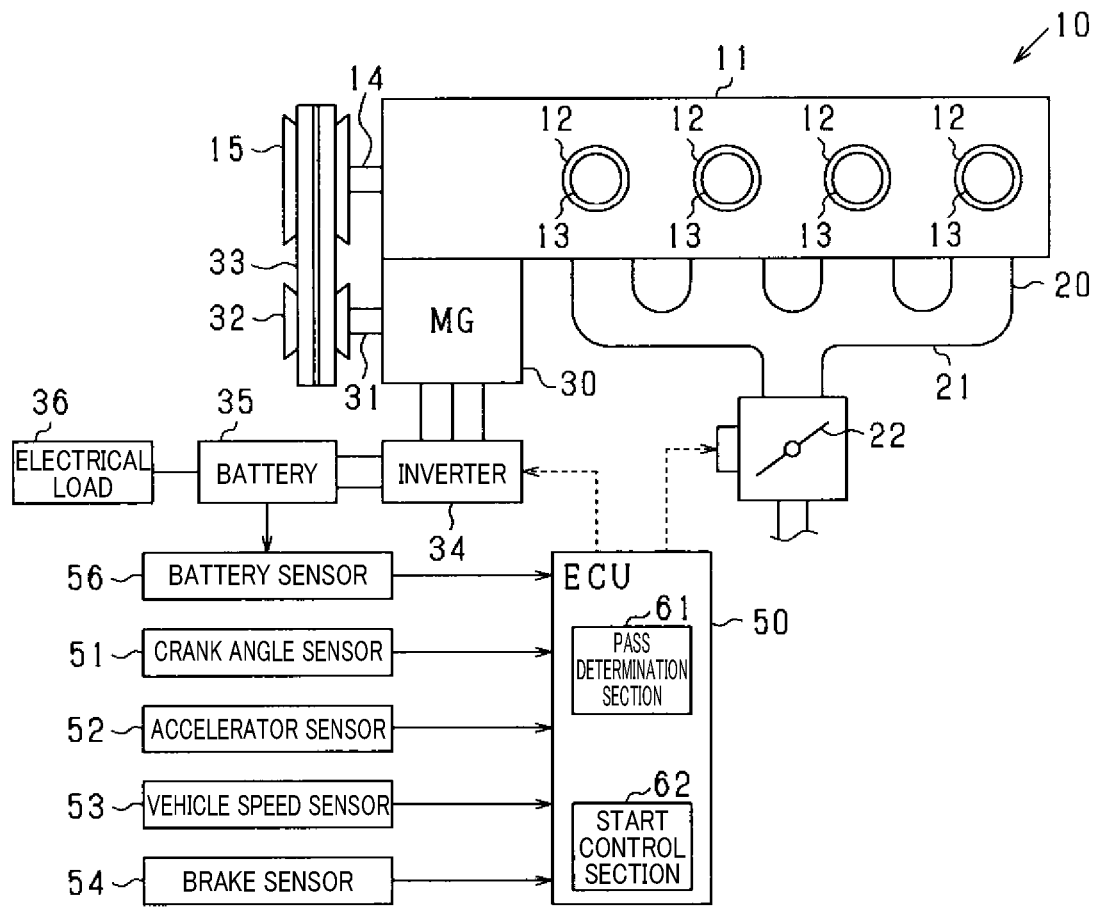
FIG. 1 is a schematic configuration diagram of an engine control system.

The engine starting method of restarting an engine by driving a motor generator (rotary electric machine) has been conventionally known in Patent Literature 1.

[PTL 1] JP 6031842 B

While an engine rotational speed drops at the time of automatic stop of the engine, a restart request may be made. In such a case, intake of air into a cylinder is repeatedly performed, and thus a larger compression reaction force is applied to a piston than after the engine is stopped. While the engine rotational speed drops, therefore, in some cases, an insufficient output torque of the motor generator with respect to the compression reaction force may prevent the piston from passing over a compression top dead center. This may cause inconvenience of reducing startability. For example, at the time of the automatic stop of the engine, when a restart request is made while the engine rotational speed is approximately zero, low rotational energy (inertial force, inertia) of an engine output shaft may cause the above inconvenience.

In order to restart the engine, assuming that a large reaction force is applied to the piston as described above, a large output torque of the motor generator is required. However, it has been difficult to obtain a large output torque of the motor generator due to various limitations.

For example, due to mounting space limitations, it has been difficult to upsize the motor generator to obtain a large output torque. Furthermore, due to an upper limit of a maximum rotational speed of the motor generator, it has also been difficult to increase a reduction ratio to obtain a large output torque.

The present disclosure has been made in order to solve the above problem, and has a main object of providing an engine start control device capable of appropriately starting an engine while reducing an output torque of a motor in a rotation drop period which is a period until rotation of the engine is stopped after combustion of the engine is stopped.

In order to solve the above problem, a first disclosure is an engine start control device that includes a motor and starts an engine using the motor in response to a start request, the motor being connectable to an engine output shaft and having power driving function, the engine start control device comprising: an pass determination section that performs a pass determination process of determining, based on a rotation state of the engine output shaft, whether a piston in a cylinder of the engine can pass over a compression top dead center for a rotation drop period in response to an occurrence of the start request, the rotation drop period being a period until an engine rotational speed drops to zero after combustion of the engine is stopped; and a start control section that when it is determined that the piston cannot pass over the compression top dead center, starts driving of the motor in a low reaction force period to start the engine, the low reaction force period being a period in which a reaction force applied to the piston by a cylinder internal pressure in the cylinder is a predetermined value or less.

When a start request is made in the rotation drop period, on the basis of the rotation state of the engine output shaft, the engine start control device performs the pass determination process of determining whether the piston in the cylinder of the engine can pass over the compression top dead center. When it is determined that the piston cannot pass over the compression top dead center, the engine start control device starts driving of the motor in the low reaction force period in which the reaction force applied to the piston is the predetermined value or less. Thus, in the rotation drop period, when there is a possibility that an output torque of the motor is insufficient with respect to the reaction force applied to the piston, the engine start control device starts driving of the motor in the low reaction force period to reliably start the engine. This makes it possible to appropriately start the engine while reducing the output torque of the motor in the rotation drop period.

According to a second disclosure, the engine start control device further includes a setting section that when it is determined that the piston cannot pass over the compression top dead center, sets a waiting time from a time point at the occurrence of the start request to a time point at which the low reaction force period will start, wherein the start control section starts driving of the motor when the waiting time has elapsed.

When, at the time point at which the start request is made, on the basis of the rotation state of the engine output shaft, it is determined that the piston cannot pass over the compression top dead center and there is a possibility that an output torque of the motor will be insufficient to overcome to the compression reaction force, the engine start control device waits to drive the motor until the low reaction force period starts. This makes it possible to appropriately start the engine while reducing the output torque of the motor in the rotation drop period.

According to a third disclosure, the setting section sets the waiting time on the basis of an engine rotational speed at the time point at the occurrence of the start request.

Without using a cylinder internal pressure sensor or the like, from the engine rotational speed when the start request is made, the engine start control device can estimate the low reaction force period in which the compression reaction force is the predetermined value or less. This makes it possible to simplify the configuration.

According to a fourth disclosure, the engine start control device further includes a period determination section that after it is determined that the piston cannot pass over the compression top dead center, acquires a rotational position of the engine output shaft and an engine rotational speed and determines, on the basis of the acquired rotational position of the engine output shaft and the acquired engine rotational speed, whether a current time is in the low reaction force period.

The compression reaction force varies depending on the rotational position of the engine output shaft, and accordingly the low reaction force period can be determined on the basis of the rotational position of the engine output shaft. Furthermore, rotational energy of the engine output shaft varies depending on the engine rotational speed, and when the rotational energy is considered, the low reaction force period also varies in which the reaction force applied to the piston is the predetermined value or less. Thus, the compression reaction force is opposed by an inertial force of the engine output shaft, and accordingly the low reaction force period also varies.

Therefore, the engine start control device includes the period determination section that determines, on the basis of the rotational position of the engine output shaft and the engine rotational speed, whether the current time is in the low reaction force period, and when the period determination section determines that the current time is in the low reaction force period, the start control section starts driving of the motor. This makes it possible to appropriately start the engine while reducing the output torque.

According to a fifth disclosure, the start control section is configured to drive the motor, before the low reaction force period, to apply a first output torque of the motor to the engine output shaft in a reverse rotational direction of the engine output shaft; and drive the motor, during the low reaction force period, to apply a second output torque of the motor to the engine output shaft in a forward rotational direction of the engine output shaft.

By driving the motor so that an output torque is applied in the direction in which the engine output shaft is reversely rotated, it is possible to reduce the rotational energy of the engine output shaft, and forcibly reduce the compression reaction force. This makes it possible to appropriately start the engine while reducing the output torque.

According to a sixth disclosure, the engine start control device further includes a rotation determination section that determines whether the engine output shaft is reversely rotating, wherein when it is determined that the engine output shaft is reversely rotating, the start control section determines that a current time is in the low reaction force period, and starts driving of the motor.

When the engine output shaft is reversely rotating, the cylinder internal pressure in the cylinder is sufficiently reduced. Thus, it is possible to identify reverse rotation of the engine output shaft to thereby determine that there is a low reaction force period in which the reaction force applied to the piston is the predetermined value or less. Therefore, the engine start control device includes the rotation determination section that determines whether the engine output shaft is reversely rotating, and when it is determined that the engine output shaft is reversely rotating, the start control section determines that the current time is in the low reaction force period, and starts driving of the motor. This makes it possible to start the engine at a suitable timing while reducing the output torque.

According to a seventh disclosure, the engine start control device further includes a rotation determination section that determines whether the engine output shaft is reversely rotating, wherein when it is determined that the engine output shaft is reversely rotating, after the engine output shaft is reversely rotated until a compression reaction force applied to the piston reaches a minimum value, the start control section starts driving of the motor.

Even when it is determined that the engine output shaft is reversely rotating and that the current time is in the low reaction force period, the engine start control device waits to start driving of the motor until the compression reaction force reaches the minimum value. This makes it possible to more reliably start the engine.

According to an eighth disclosure, in a case where it is determined that the engine output shaft is reversely rotating, the start control section is configured to: drive the motor, before the compression reaction force reaches the minimum value, to apply a third output torque of the motor to the engine output shaft in a reverse rotational direction of the engine output shaft; and drive the motor, after the compression reaction force reaches the minimum value, to apply a fourth output torque of the motor to the engine output shaft in a forward rotational direction of the engine output shaft.

When the engine output shaft is reversely rotating, by driving the motor so that an output torque is applied in the direction in which the engine output shaft is reversely rotated, it is possible to reduce the time until the compression reaction force reaches the minimum value. Thus, the engine can be restarted at an earlier timing.

According to a ninth disclosure, the start control section applies a field current before the low reaction force period.

This makes it possible to improve responsiveness when the motor is driven.

According to a tenth disclosure, the engine start control device further includes: a storage section that stores a history of an engine rotational speed in the rotation drop period; and a stop estimation section that estimates the engine rotational speed on the basis of the history of the engine rotational speed stored in the storage section, wherein the pass determination section performs the pass determination process on the basis of the estimation by the stop estimation section.

In the period immediately before the rotation of the engine is stopped, the piston is most unlikely to pass over the compression top dead center. On the other hand, a timing at which the rotation of the engine is stopped can be estimated on the basis of the history of the engine rotational speed. Therefore, the engine start control device estimates the engine rotational speed and performs the pass determination process on the basis of the estimation. This makes it possible to appropriately determine whether the piston can pass over the compression top dead center.

According to an eleventh disclosure, the pass determination section performs the pass determination process on the basis of the rotation state of the engine output shaft and a torque capable of being outputted by the motor.

This makes it possible to more accurately perform the pass determination process.

According to a twelfth disclosure, the engine start control device further includes a temperature information acquisition section that acquires temperature information on at least one of the engine and the motor, wherein the low reaction force period is corrected on the basis of the temperature information acquired by the temperature information acquisition section.

A compression reaction force, an output torque capable of being outputted by the motor, and the like vary depending on the temperature. Therefore, the engine start control device corrects the low reaction force period on the basis of the temperature information. This makes it possible to reliably restart the engine even while reducing the output torque.

According to a thirteenth disclosure, the engine start control device further includes a remaining battery amount acquisition section that acquires a remaining battery amount of a battery that supplies electric power to the motor, wherein the low reaction force period is corrected on the basis of the remaining battery amount acquired by the remaining battery amount acquisition section.

An output torque capable of being outputted by the motor varies depending on the remaining battery amount. Therefore, the engine start control device corrects the low reaction force period on the basis of the remaining battery amount. This makes it possible to reliably restart the engine even while reducing the output torque.

First Embodiment

An embodiment of the present disclosure will be described below with reference to the drawings. The present embodiment is an embodiment of a control system for an engine mounted on a vehicle. The control system includes an electronic control unit (hereinafter referred to as an ECU) serving as the core of the system, and controls an operating state of the engine, and the like. FIG. 1 shows a schematic diagram of the entire system.

In a vehicle 10 shown in FIG. 1, an engine 11 is a four-cycle engine (four-stroke engine) that is driven by combustion of fuel such as gasoline and repeatedly performs strokes of intake, compression, expansion, and exhaust. The engine 11 includes four cylinders 12, and the cylinders 12 each house a piston 13. Furthermore, the engine 11 includes a fuel injection valve (not shown), an ignition device (not shown), and the like as appropriate. In the present embodiment, the engine 11 includes the four cylinders, but the engine 11 may include any number of cylinders. Furthermore, the engine 11 is not limited to a gasoline engine, and may be a diesel engine.

Air is supplied to the cylinders 12 from an intake section 20. The intake section 20 includes an intake manifold 21. Upstream from the intake manifold 21, a throttle valve 22 that adjusts an intake air amount is provided.

An MG (motor generator) 30 is integrated with the engine 11. The MG 30 is a rotary electric machine that is driven as a motor and a generator. A crankshaft (engine output shaft) 14 of the engine 11 is mechanically connected to a crank pulley 15, and a rotating shaft 31 of the MG 30 is mechanically connected to an MG pulley 32. The crank pulley 15 and the MG pulley 32 are drivingly connected to each other by a belt 33. When the engine is started, rotation of the MG 30 provides initial rotation (cranking rotation) to the engine 11. A starter motor may be separately provided so that rotation of the starter motor can provide initial rotation to the engine 11.

The MG 30 is connected to a battery 35 via an inverter 34 which is an electric power conversion circuit. When the MG 30 is driven as a motor, by a command from an ECU 50, electric power is supplied from the battery 35 to the MG 30 via the inverter 34, thereby driving (power driving) the MG 30. The inverter 34 may include another ECU that controls the electric power conversion circuit of the inverter 34 in response to a command from the ECU 50. On the other hand, when the MG 30 functions as a generator, electric power generated by the MG 30 is converted from AC power into DC power by the inverter 34 and then the DC power is charged to the battery 35. Electrical loads 36 such as lamps and an audio device are connected to the battery 35.

The ECU 50 is an electronic control device including a microcomputer or the like. The microcomputer is composed of a well-known CPU, ROM, RAM, and the like. On the basis of detection results obtained by various sensors of the system, the ECU 50 performs various types of engine control such as control of an opening degree of the throttle valve 22 and control of fuel injection by the fuel injection valve.

More specifically, regarding the sensors, a crank angle sensor 51 is connected to the ECU 50. The crank angle sensor 51 detects a rotational position (rotational angle position, crank angle) of the crankshaft 14 and an engine rotational speed. Furthermore, an accelerator sensor 52 is connected to the ECU 50. The accelerator sensor 52 detects an accelerator operation amount (accelerator opening degree). Furthermore, a vehicle speed sensor 53 and a brake sensor 54 are connected to the ECU 50. The vehicle speed sensor 53 detects a vehicle speed, and the brake sensor 54 detects a brake pedal operation amount. Furthermore, a battery sensor 56 is connected to the ECU 50. The battery sensor 56 detects a battery state of the battery 35. Signals from these sensors are sequentially inputted into the ECU 50.

The crank angle sensor 51 is, for example, an electromagnetic pick-up type rotational position detection device that outputs a rectangular detection signal (crank pulse signal) for each predetermined crank angle (e.g., at a 30° C.A cycle). An engine rotational speed is calculated from time required for each rotation of the crankshaft 14 at a predetermined crank angle. From a detection result obtained by the crank angle sensor 51, a rotational position (rotational angle position, crank angle) of the crankshaft 14 with respect to a predetermined reference position (e.g., compression top dead center) is calculated, and in addition, a stroke of the engine 11 is determined.

The battery sensor 56 detects an inter-terminal voltage, a charge/discharge current, and the like of the battery 35. On the basis of the detection values, a battery remaining capacity (SOC) of the battery 35 is calculated by the ECU 50. Therefore, the ECU 50 functions as a remaining battery amount acquisition section.

The ECU 50 performs idle stop control of the engine 11. Roughly speaking, in the idle stop control, when a predetermined automatic stop condition is satisfied, combustion of the engine 11 is stopped, and then when a predetermined restart condition is satisfied, the engine 11 is restarted. In this case, the automatic stop condition includes, for example, a condition in which a vehicle speed of the own vehicle is in an engine automatic stop speed range (e.g., the vehicle speed≤10 km/h) and accelerator operation is released or brake operation is performed. The restart condition includes, for example, a condition in which accelerator operation is started and a condition in which brake operation is released. The engine control function and the idle stop function may be performed by separate ECUs. Thus, the ECU 50 is an engine start control device.

Figure 2:
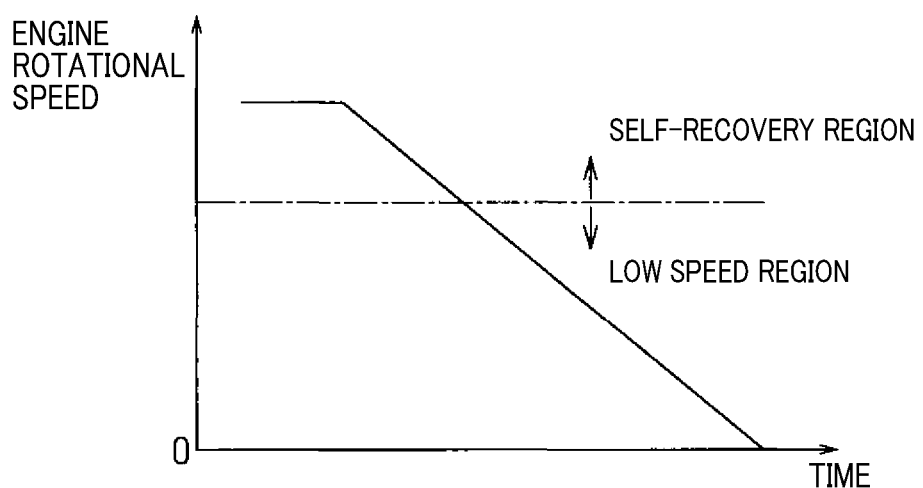
FIG. 2 is a transition chart of an engine rotational speed in a rotation drop period.

A transition of the engine rotational speed when the automatic stop condition of the engine 11 is satisfied in the vehicle 10 will be described below. FIG. 2 shows a transition of the engine rotational speed in a rotation drop period which is a period until the engine rotational speed becomes zero after combustion of the engine 11 is stopped. When the automatic stop condition of the engine 11 is satisfied in an idle state, combustion of the engine 11 is stopped. Then, the engine rotational speed is gradually reduced and passes through a self-recovery region. The self-recovery region is a region for the engine rotational speed in which the engine 11 can be restarted by resuming fuel supply without cranking while combustion of the engine 11 is stopped. A lower limit of the self-recovery region is set to, for example, approximately 600 rpm.

When the engine rotational speed passes through the self-recovery region and is further gradually reduced, the engine rotational speed passes through a low speed region and becomes zero (the rotation of the engine 11 is stopped). In some cases, immediately before the rotation of the engine 11 is stopped, swing back (reverse rotation) of the engine 11 occurs. The swing back occurs when, at the time of stopping the engine 11, the piston 13 is pushed back toward a bottom dead center by a compression reaction force applied to the piston 13 due to a cylinder internal pressure in the cylinder 12.

In the system, when the restart condition is satisfied (when a start request is made) in the rotation drop period, the engine 11 is started (restarted) at the earliest possible timing before the rotation of the engine 11 is completely stopped.

In the rotation drop period, however, intake of air into the cylinder 12 is repeatedly performed, and thus a larger compression reaction force may be applied to the piston 13 than after the engine 11 is stopped. In the rotation drop period, therefore, in some cases, an insufficient output torque of the MG 30 with respect to the compression reaction force may prevent the piston 13 from passing over a compression top dead center (TDC). This may cause inconvenience of reducing startability. Thus, in some cases, the engine 11 cannot be reliably started. For example, at the time of the automatic stop of the engine, when the restart condition is satisfied while the engine rotational speed is approximately zero, a relatively large compression reaction force due to low rotational energy (inertial force, inertia) of the crankshaft 14 may cause such inconvenience.

In order to restart the engine 11 assuming that a large reaction force is applied to the piston 13 as described above, a large output torque of the MG 30 is required. However, it has been difficult to obtain a large output torque of the MG 30 due to various limitations.

For example, due to mounting space limitations, it has been difficult to upsize the MG 30 to obtain a large output torque. Furthermore, due to an upper limit of a maximum rotational speed of the MG 30 (a possible failure by an excessively high rotational speed of the MG 30), it has also been difficult to increase a reduction ratio to obtain a large output torque.

In the present embodiment, therefore, when the engine rotational speed is in the low speed region, by performing ingenious start control, it is possible to appropriately restart the engine 11 while reducing the output torque of the MG 30.

Specifically, when the restart condition is satisfied in the rotation drop period, on the basis of a rotation state of the crankshaft 14, the ECU 50 performs an pass determination process of determining whether the piston 13 can pass over the compression top dead center. When it is determined that the piston 13 cannot pass over the compression top dead center, the ECU 50 starts driving of the MG 30 in a low reaction force period to start the engine 11. The low reaction force period is a period in which a reaction force applied to the piston 13 is a predetermined value or less.

Therefore, the ECU 50 of the present embodiment has a function as an pass determination section 61 that performs the pass determination process on the basis of the rotation state of the crankshaft 14 in the rotation drop period. Furthermore, the ECU 50 has a function as a start control section 62 that starts driving of the MG 30 in the low reaction force period to start the engine 11. The low reaction force period is the period in which the reaction force applied to the piston 13 is the predetermined value or less. These functions will be described in detail below.

First, the pass determination section 61 will be described. In the present embodiment, in the rotation drop period, the ECU 50 stores a history of an engine rotational speed as the rotation state of the crankshaft 14 in a storage section (storage memory). On the basis of the history, the ECU 50 as the pass determination section 61 estimates an engine rotational speed and uses the estimated data to perform the pass determination process. Therefore, the ECU 50 of the present embodiment has a function as the storage section that stores a history of an engine rotational speed in the rotation drop period and a function as a stop estimation section that estimates an engine rotational speed on the basis of the history of the engine rotational speed.

A method of estimating the engine rotational speed will be described. The ECU 50 sets, as a rotation pulsation period, one cycle of increase/decrease in engine rotational speed caused by increase/decrease in cylinder volume. On the basis of energy loss in the previous rotation pulsation period, the ECU 50 estimates an engine rotational speed in the subsequent rotation pulsation period to estimate an engine rotational speed during forward rotation of the engine.

More specifically, the ECU 50 assumes that energy loss during the forward rotation in the rotation drop period is constant when a rotational position of the crankshaft 14 determined by a piston position is the same. On the basis of this assumption, the ECU 50 sets, as the rotation pulsation period, one cycle of increase/decrease (180° C.A in the present embodiment) in engine rotational speed (instantaneous rotational speed Ne) caused by increase/decrease in cylinder volume. On the basis of an engine rotational speed in the rotation pulsation period prior to the current time point, the ECU 50 estimates an engine rotational speed in the subsequent rotation pulsation period.

Thus, assuming that an engine torque shows a similar tendency in successive rotation pulsation periods during the forward rotation of the engine, the ECU 50 estimates an engine rotational speed at time points subsequent to the current time point. The instantaneous rotational speed Ne is an engine rotational speed calculated from time required for the crankshaft 14 to rotate at a predetermined rotational angle. In this estimation method, the ECU 50 repeats multiple times a process of calculating a rotational position (crank angle) at which a next crank pulse signal is outputted, i.e., an estimated value of the instantaneous rotational speed Ne at the next calculation timing and calculating, on the basis of the estimated value, an estimated value of the instantaneous rotational speed Ne at the calculation timing subsequent to the next calculation timing. This allows estimation of the engine rotational speed (determination of an estimated rotation track) in the rotation drop period.

Figure 3:
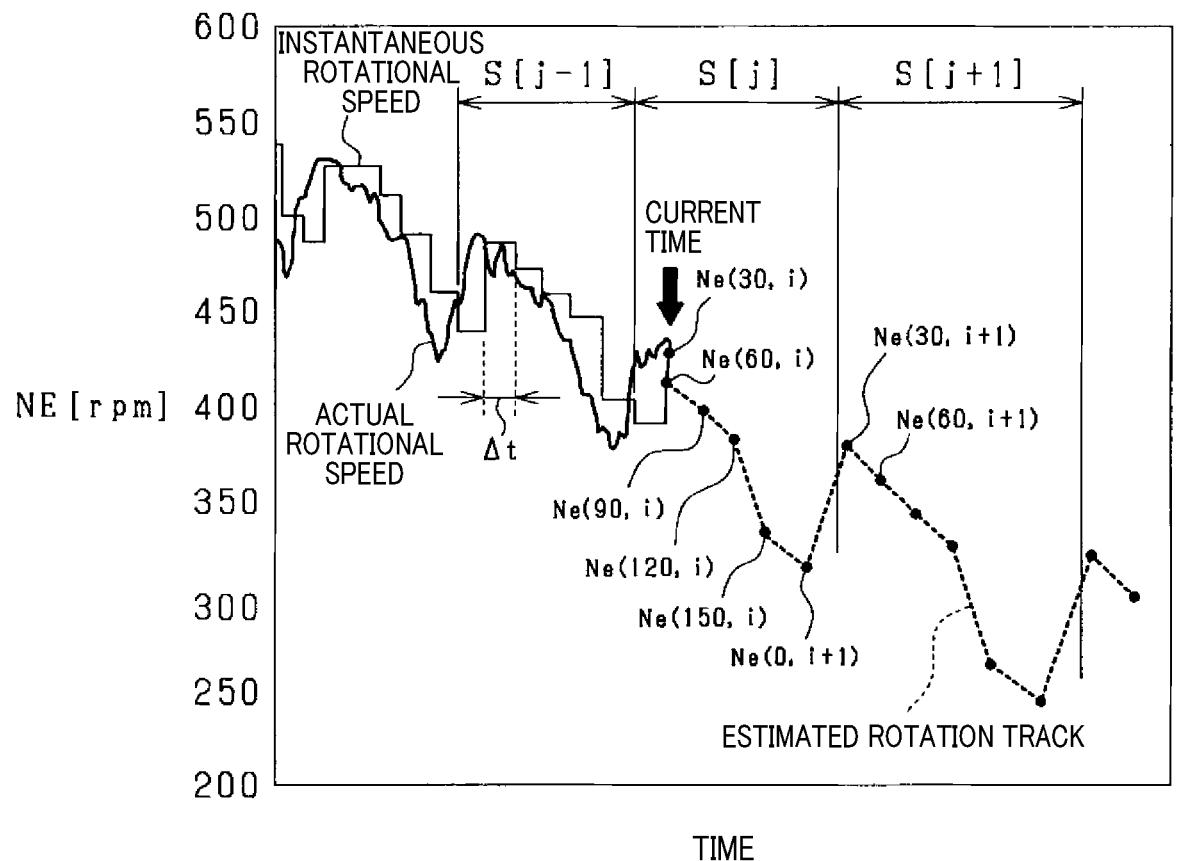
FIG. 3 is a diagram for explaining estimation of the engine rotational speed.

FIG. 3 is a diagram for explaining the method of estimating the engine rotational speed. In FIG. 3, among 180° C.A sections (rotation pulsation periods) from a top dead center (TDC) to a next TDC of each of the cylinders, S [j] represents the current rotation pulsation period, S [j−1] represents the previous rotation pulsation period, and S [j+1] represents the next rotation pulsation period.

In the rotation drop period after the engine automatic stop condition is satisfied, every time a crank pulse signal is inputted from the crank angle sensor 51 (every 30° C.A in the present embodiment), the ECU 50 calculates an instantaneous rotational speed Ne (i) on the basis of a time width Δt [sec], and stores the instantaneous rotational speed Ne (i) each time. The time width Δt [sec] is a time from the previous pulse rising timing to the current pulse rising timing.

On the basis of a change in instantaneous rotational speed Ne (θ, i−1) for each predetermined rotational angle θ (crank resolution) from the top dead center (TDC), the ECU 50 calculates an engine torque Te (θn−θn+1) between rotational positions in the rotation pulsation period. For example, an engine torque Te (j−1)(θn−θn+1) between rotational positions in the previous rotation pulsation period (the previous 180° C.A section) S [j−1] is expressed by the following equation (1).

$$Te(j-1)(\theta n-\theta n+1)=-J\cdot(\omega(j-1)(\theta n+1))2-(\omega(j-1)(\theta n))2)/2 \quad (1)$$

Wherein ω (θn) [rad/sec]=Ne (θn)×360/60

In equation (1), J represents inertia of the engine 11 (crankshaft 14), which is calculated in advance on the basis of design data on the engine 11 or the like and stored in the storage section in the present embodiment.

In FIG. 3, the current rotational position is 30° C.A after the TDC. When the next and subsequent engine rotational speeds are estimated, first, an instantaneous rotational speed Ne (30, i) at the current time point is calculated on the basis of the crank pulse signal. By using the calculated instantaneous rotational speed Ne (30, i) and an instantaneous rotational speed Ne (0, i) at the immediately previous rotational position, an engine torque Te (0-30, i) is calculated by equation (1) and stored.

Next, by using an engine torque between a rotational position at which the rotational position with respect to the top dead center (TDC) has the same value as the estimated value and the previous rotational position in the previous 180° C.A section S [j−1], i.e., an engine torque Te (j−1)(30−60) in this case, and using the current instantaneous rotational speed Ne (30, i), the ECU 50 calculates an estimated value Ne (60, i) at a rotational position 60° C.A as the estimated value of the engine rotational speed at the next pulse rising timing. In addition, the ECU 50 calculates estimated arrival time t (j)(30−60) required to move from the rotational position 30° C.A to the rotational position 60° C.A.

Furthermore, by using an engine torque Te (j−1)(60−90) from the rotational position 60° C.A to a rotational position 90° C.A in the previous 180° C.A section S [j−1] and using the estimated value Ne (60, i) of the engine rotational speed, the ECU 50 calculates an estimated value Ne (90, i) of the rotational position at a rotational angle of 90° C.A after the TDC in the current 180° C.A section S [j], and also calculates estimated arrival time t (j)(60-90) required to move from the rotational position 60° C.A to the rotational position 90° C.A. By repeating this process multiple times, the ECU 50 estimates the engine rotational speed (instantaneous rotational speed Ne) in the rotation drop period of the engine 11, and for example, by linear interpolation of the estimated data, the ECU 50 estimates a track (estimated rotation track) of the engine rotational speed in the rotation drop period. Black dots in FIG. 3 indicate the estimated values of the instantaneous rotational speed Ne calculated on the basis of the estimation method, and a dashed line in FIG. 3 indicates the estimated rotation track calculated on the basis of the estimation method.

Every time a crank pulse signal is inputted to ECU 50 (every 30° C.A), the estimation calculation is performed by the ECU 50 during the time until a next crank pulse signal is inputted to ECU 50, and the estimated data (estimated rotation track) is updated each time. At this time, in the period until the next crank pulse signal is inputted, the ECU 50 estimates a track until the rotation of the engine 11 is stopped. The estimation calculation may be performed by converting the engine rotational speed (instantaneous rotational speed) into an angular velocity.

On the basis of the estimated data, the ECU 50 performs the pass determination process of determining whether the piston 13 can pass over the compression top dead center.

Figure 4:
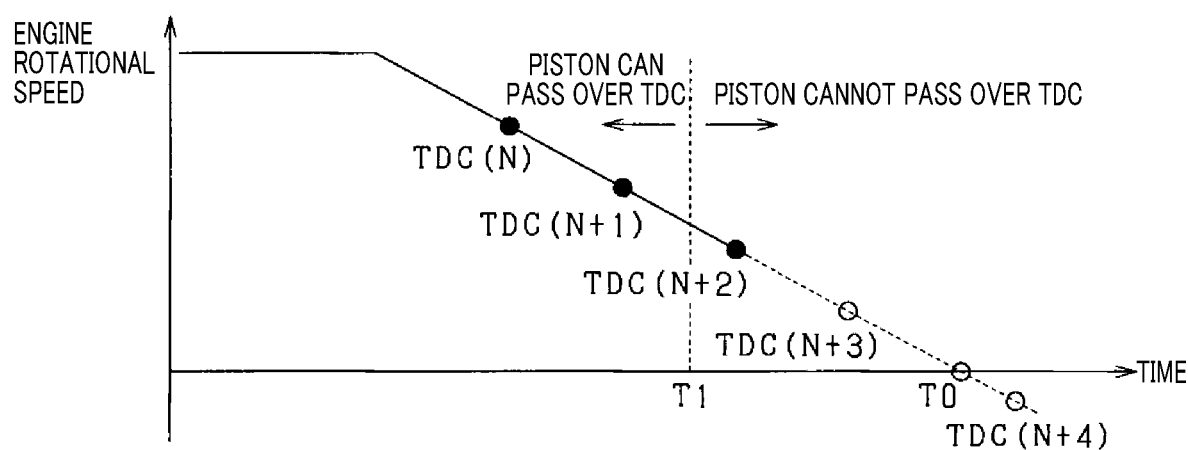
FIG. 4 is a diagram showing a period in which a negative determination is made in an pass determination process.

Specifically, as shown in FIG. 4, on the basis of estimated data (estimated rotation track) indicated by a dashed line, the ECU 50 determines a time point T0 at which the engine rotational speed is zero. In FIG. 4, a solid line schematically indicates an actual engine rotational speed. From the estimated data on the engine rotational speed, the ECU 50 determines a top dead center (TDC (N+3) in FIG. 4) at the time point prior to the time point T0 at which the engine rotational speed is 0. At and after the time point T0 (e.g., TDC (N+4) in FIG. 4) at which the engine rotational speed is 0, the piston 13 cannot pass over the top dead center. Accordingly, when the ECU 50 performs the pass determination process at least in a period from the time point with the TDC (N+3) to the time point T0 at which the engine rotational speed is zero, the ECU 50 makes a negative determination in the pass determination process.

In the present embodiment, a single cycle is composed of four strokes (intake, compression, expansion, and exhaust strokes). Thus, when the engine 11 is started, the piston 13 needs to pass over the top dead center twice. Accordingly, the ECU 50 determines the second top dead center (TDC (N+2) in FIG. 4) prior to the time point T0 at which the engine rotational speed is zero. Also when the ECU 50 performs the pass determination process in a period from the time point with the TDC (N+2) to the time point T0 at which the engine rotational speed is zero, the ECU 50 preferably makes a negative determination in the pass determination process. Thus, considering the possibility that the piston 13 cannot pass over the top dead center at the exhaust stroke, the ECU 50 preferably makes a negative determination in the pass determination process in the period from the time point with the TDC (N+2) to the time point T0 at which the engine rotational speed is zero.

When the engine 11 is started, in some cases, fuel injection is performed before the intake stroke. Considering time required for the fuel injection, the ECU 50 preferably makes a negative determination in the pass determination process from a predetermined time before the time point with the TDC (N+2) or the TDC (N+3).

Therefore, when the ECU 50 of the present embodiment performs the pass determination process (i.e., when a start request is made) in a period from the time point T1, which is a predetermined time before the time point with the TDC (N+2), to the time point T0 at which the engine rotational speed is zero, the ECU 50 makes a negative determination in the pass determination process. Thus, the ECU 50 performs the pass determination process considering the time required for the fuel injection and the fact that the engine 11 is the four-stroke engine. Also at and after the time point T0 at which the engine rotational speed is zero, the ECU 50 makes a negative determination in the pass determination process.

Next, the start control section 62 will be described. When, in the rotation drop period, it is determined that the piston 13 can pass over the compression top dead center, and the restart condition is satisfied, the ECU 50 as the start control section 62 starts driving of the MG 30 as soon as possible. Thus, when an affirmative determination is made in the pass determination process, an inertial force based on the rotational energy of the crankshaft 14 is larger than the compression reaction force, and accordingly the compression reaction force is cancelled. As a result, an output torque required to start the engine 11 is not larger than an output torque when the piston 13 is stopped. Accordingly, when an affirmative determination is made in the pass determination process, the ECU 50 starts driving of the MG 30 as soon as possible to promptly restart the engine 11.

On the other hand, when, in the rotation drop period, it is determined that the piston 13 cannot pass over the compression top dead center, and the restart condition is satisfied, the ECU 50 as the start control section 62 starts driving of the MG 30 in the low reaction force period in which the reaction force applied to the piston 13 is the predetermined value or less.

A method of starting driving of the MG 30 in the low reaction force period will be described below.

When it is determined that the piston 13 cannot pass over the compression top dead center, the ECU 50 sets a waiting time from a time point at which the restart condition is satisfied to a time point at which the low reaction force period starts. When the waiting time has elapsed, the ECU 50 starts driving of the MG 30.

More specifically, the ECU 50 sets the waiting time according to an engine rotational speed when the restart condition is satisfied (when a start request is made). Thus, the engine rotational speed is assumed to drop with predetermined periodicity, and accordingly, from the engine rotational speed, the ECU 50 can estimate a period in which the cylinder internal pressure in the cylinder 12 is reduced and the reaction force applied to the piston 13 is the predetermined value or less. Specifically, from the engine rotational speed, the ECU 50 can estimate a period (low reaction force period) in which the engine rotational position is around 90° C.A. Thus, the ECU 50 sets the waiting time according to the engine rotational speed. When the engine rotational speed is higher, the compression reaction force is larger, and thus the ECU 50 sets the waiting time to be longer. Therefore, the ECU 50 has a function as a setting section that sets a waiting time until the low reaction force period starts.

The waiting time is measured, for example, by experiment or the like, and stored in the storage section for each engine rotational speed. The ECU 50 may determine a waiting time corresponding to the engine rotational speed on the basis of the design data, and store the waiting time in the storage section. Furthermore, the ECU 50 may estimate the low reaction force period on the basis of the estimated data described above, and set the waiting time. For example, the ECU 50 may use the periodicity of the estimated data described above to estimate the period (low reaction force period) in which the engine rotational position is around 90° C.A, and set the waiting time.

When the crankshaft 14 is reversely rotating, it is assumed that the cylinder internal pressure in the cylinder 12 is sufficiently reduced and the reaction force applied to the piston 13 is the predetermined value or less. Thus, the ECU 50 determines whether the crankshaft 14 is reversely rotating, and when it is determined that the crankshaft 14 is reversely rotating, the ECU 50 immediately drives the MG 30 without setting the waiting time. Therefore, the ECU 50 of the present embodiment has a function as a rotation determination section. In the present embodiment, the ECU 50 determines whether the crankshaft 14 is reversely rotating. However, the ECU 50 may determine whether the crankshaft 14 is forward rotating.

Figure 5:
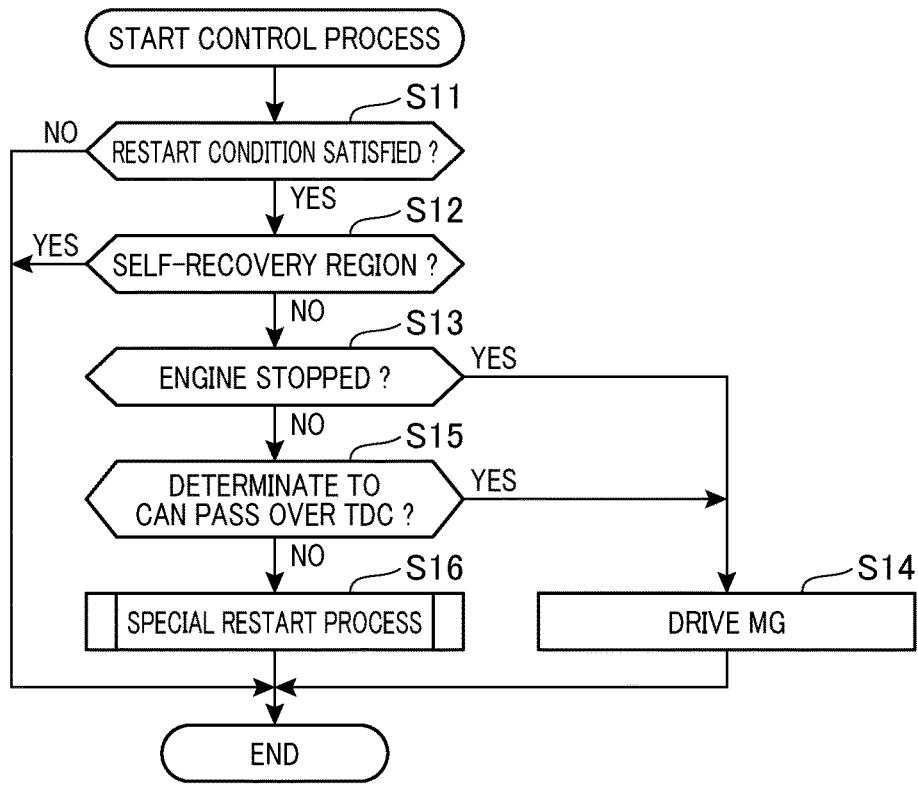
FIG. 5 is a flow chart showing a start control process.

Next, a start control process to start the engine 11 will be described with reference to FIG. 5. The start control process is performed by the ECU 50 at a predetermined cycle after the automatic stop condition of the engine 11 is satisfied.

The ECU 50 determines whether the restart condition is satisfied (whether a start request is made) (step S11). When a negative determination is made at step S11, the ECU 50 ends the start control process.

On the other hand, when an affirmative determination is made at step S11, the ECU 50 determines whether an engine rotational speed is in the self-recovery region (step S12). When an affirmative determination is made at step S12, the ECU 50 ends the start control process without driving the MG 30. Thus, the ECU 50 restarts the engine 11 by resuming the fuel supply.

On the other hand, when a negative determination is made at step S12, on the basis of the engine rotational speed and the like, the ECU 50 determines whether the engine 11 is completely stopped (the rotation of the engine 11 is stopped) (step S13). When an affirmative determination is made at step S13, the ECU 50 immediately starts driving of the MG 30 (step S14) to restart the engine 11, and ends the start control process.

When a negative determination is made at step S13, the ECU 50 performs the pass determination process as described above (step S15). When an affirmative determination is made at step S15 (when it is determined that the piston 13 can pass over the compression top dead center), the ECU 50 immediately starts driving of the MG 30 (step S14) to restart the engine 11, and ends the start control process.

On the other hand, when a negative determination is made at step S15 (when it is determined that the piston 13 cannot pass over the compression top dead center), the ECU 50 performs a special restart process (step S16). The special restart process is a process to start (restart) the engine 11 when the engine rotational speed is in the low speed region (in a period until the engine 11 is completely stopped after the engine rotational speed passes through the self-recovery region). After the special restart process is performed, the ECU 50 ends the start control process.

Figure 6:
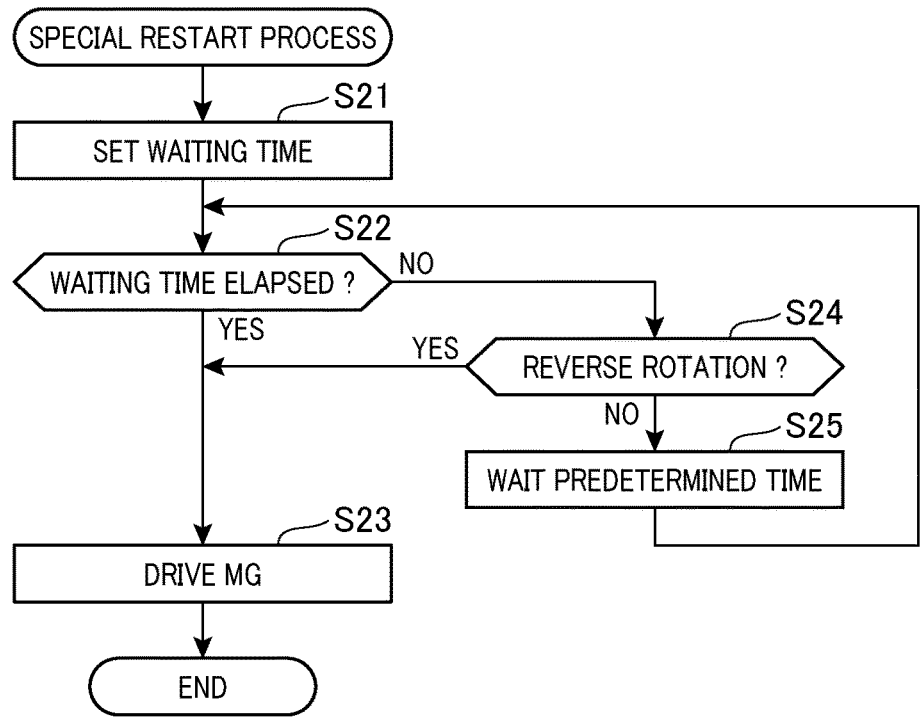
FIG. 6 is a flow chart showing a special restart process.

The special restart process at step S16 will be described below with reference to FIG. 6.

The ECU 50 sets a waiting time from a time point at which the restart condition is satisfied to a time point at which the low reaction force period starts (step S21). Thus, the ECU 50 sets the waiting time corresponding to an engine rotational speed when the restart condition is satisfied (when a start request is made).

Subsequently, the ECU 50 determines whether the waiting time has elapsed (step S22). When an affirmative determination is made at step S22, the ECU 50 starts driving of the MG 30 (step S23) to restart the engine 11. Then, the ECU 50 ends the special restart process.

On the other hand, when a negative determination is made at step S22, the ECU 50 determines whether the crankshaft 14 is reversely rotating (step S24). A rotation direction of the crankshaft 14 can be determined on the basis of a transition of the rotational position acquired by the crank angle sensor 51 or the like.

When an affirmative determination is made at step S24 (when the crankshaft 14 is reversely rotating), the ECU 50 immediately starts driving of the MG 30 (step S23) to restart the engine 11. Then, the ECU 50 ends the special restart process.

On the other hand, when a negative determination is made at step S24 (when the crankshaft 14 is forward rotating), the ECU 50 waits a predetermined time (step S25), and then control proceeds to step S22.

The present embodiment described in detail above yields the following good effects.

In the rotation drop period, on the basis of the rotation state of the crankshaft 14, the ECU 50 performs the pass determination process of determining whether the piston 13 can pass over the compression top dead center. When it is determined that the piston 13 cannot pass over the compression top dead center, the ECU 50 starts driving of the MG 30 in the low reaction force period in which the reaction force applied to the piston 13 is the predetermined value or less. Thus, in the rotation drop period, when there is a possibility that an output torque of the MG 30 is insufficient with respect to the reaction force applied to the piston 13, the ECU 50 starts driving of the MG 30 in the low reaction force period to reliably start the engine 11. This makes it possible to appropriately start the engine 11 while reducing the output torque of the MG 30 in the rotation drop period.

When, at the time point at which the restart condition is satisfied, on the basis of the rotation state of the crankshaft 14, it is determined that the piston 13 cannot pass over the compression top dead center and there is a possibility that an output torque of the MG 30 is insufficient with respect to the reaction force applied to the piston 13, the ECU 50 waits to drive the MG 30 until the low reaction force period starts. This makes it possible to appropriately start the engine 11 while reducing the output torque of the MG 30 in the rotation drop period.

On the basis of the engine rotational speed when the restart condition is satisfied (when a start request is made), the ECU 50 sets the waiting time until the low reaction force period starts. Thus, without using a cylinder internal pressure sensor or the like, from the engine rotational speed, the ECU 50 can estimate (determine) the low reaction force period. This makes it possible to simplify the configuration.

When the crankshaft 14 is reversely rotating, the cylinder internal pressure in the cylinder 12 is sufficiently reduced. Thus, it is possible to identity reverse rotation of the crankshaft 14 to thereby determine that there is a low reaction force period in which the reaction force applied to the piston 13 is the predetermined value or less. Therefore, the ECU 50 determines whether the crankshaft 14 is forward rotating, and when it is determined that the crankshaft 14 is reversely rotating, the ECU 50 determines that the current time is in the low reaction force period, and starts driving of the MG 30. This makes it possible to start the engine 11 at a suitable timing while reducing the output torque.

The ECU 50 estimates the engine rotational speed on the basis of the history of the engine rotational speed and performs the pass determination process on the basis of the estimated data. In the period immediately before the rotation of the engine 11 is stopped, the piston 13 is most unlikely to pass over the compression top dead center. On the other hand, a timing at which the engine 11 is stopped can be estimated on the basis of the history of the engine rotational speed. Therefore, the ECU 50 estimates the engine rotational speed and performs the pass determination process on the basis of the estimation. This makes it possible to appropriately determine whether the piston 13 can pass over the compression top dead center.

Second Embodiment

The control system is not limited to the above embodiment, and for example, may be implemented as below. In the following, the same or equivalent portions of the embodiments are given the same reference numerals, and description of the portions given the same reference numerals is incorporated.

In the first embodiment, in the special restart process, the waiting time until the low reaction force period starts is set according to the engine rotational speed when the restart condition is satisfied. In the second embodiment, the low reaction force period is determined on the basis of an engine rotational speed and a rotational position of the crankshaft 14.

More specifically, a compression reaction force applied to the piston 13 varies depending on the rotational position of the crankshaft 14, and accordingly the low reaction force period can be determined on the basis of the rotational position of the crankshaft 14. Furthermore, rotational energy (inertial force) of the crankshaft 14 varies depending on the engine rotational speed, and when the rotational energy is considered, the low reaction force period also varies in which the reaction force applied to the piston 13 is the predetermined value or less. Thus, the compression reaction force is opposed by the inertial force of the crankshaft 14, and accordingly the low reaction force period is required to vary depending on the engine rotational speed.

Therefore, by acquiring a rotational position of the crankshaft 14 and an engine rotational speed and using a combination of the acquired rotational position of the crankshaft 14 and the acquired engine rotational speed, it can be determined whether the current time is in the low reaction force period (whether driving of the MG 30 is permitted).

In the second embodiment, therefore, a determination map is stored in the storage section. The determination map is used to determine, from a combination of the rotational position (BTDC) of the crankshaft 14 and the engine rotational speed, whether the current time is in the low reaction force period. With reference to the determination map, the ECU 50 determines whether the current time is in the low reaction force period. The determination map is set, for example, on the basis of experiment, the design data, or the like, and stored in the storage section.

Figure 7:
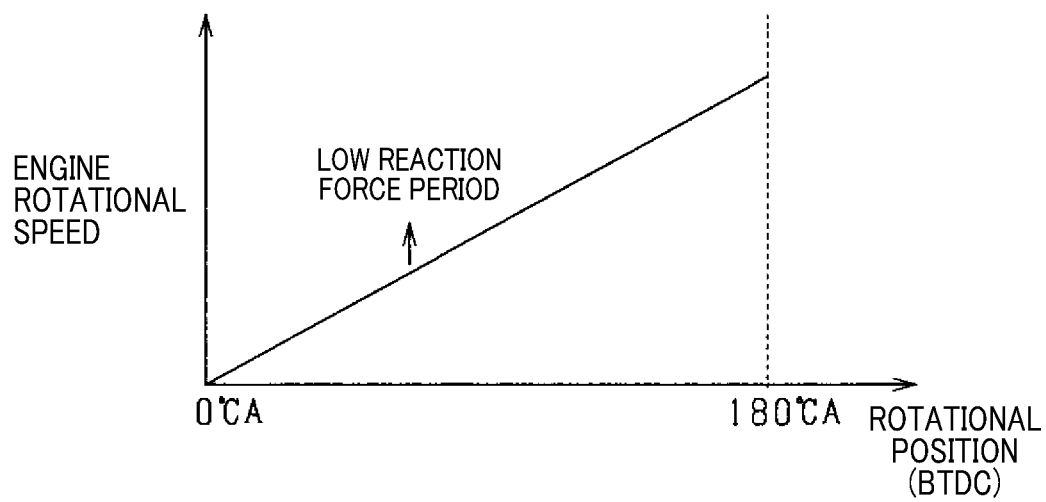
FIG. 7 is a diagram showing a determination map.

FIG. 7 shows an example of the determination map. A region above a solid line is a region in which it is determined that the current time is in the low reaction force period, and a region below the solid line is a region in which it is determined that the current time is not in the low reaction force period. As shown in FIG. 7, in the low reaction force period, as the engine rotational speed is increased, a range of the rotational position is increased at which it is determined that the current time is in the low reaction force period. In the low reaction force period, as the engine rotational speed is reduced, the rotational position becomes closer to the top dead center (0° C.A).

Figure 8:
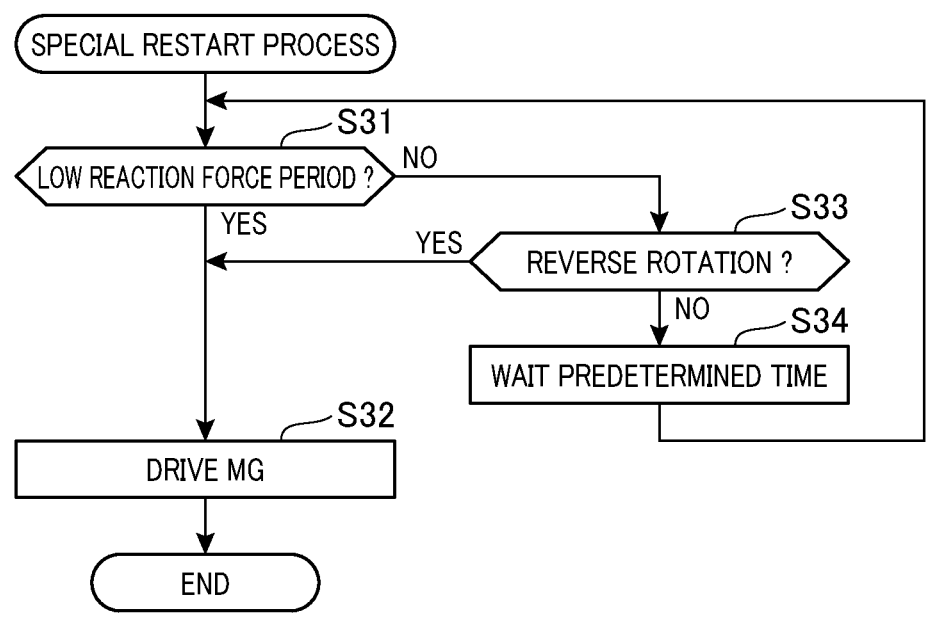
FIG. 8 is a flow chart showing a special restart process of a second embodiment.

A special restart process of the second embodiment will be described below with reference to FIG. 8.

The ECU 50 acquires an engine rotational speed and a rotational position at the current time point, and on the basis of the acquired engine rotational speed and rotational position and with reference to the determination map, the ECU 50 determines whether the current time is in the low reaction force period (whether the current time is in a period in which driving of the MG 30 is permitted) (step S31). When an affirmative determination is made at step S31, the ECU 50 starts driving of the MG 30 (step S32) to restart the engine 11. Then, the ECU 50 ends the special restart process.

On the other hand, when a negative determination is made at step S31, the ECU 50 determines whether the crankshaft 14 is reversely rotating (step S33). When an affirmative determination is made at step S33 (when the crankshaft 14 is reversely rotating), the ECU 50 immediately starts driving of the MG 30 (step S32) to restart the engine 11. Then, the ECU 50 ends the special restart process.

On the other hand, when a negative determination is made at step S33 (when the crankshaft 14 is forward rotating), the ECU 50 waits a predetermined time (step S34), and then control proceeds to step S31. Therefore, the ECU 50 has a function as a period determination section that on the basis of the acquired rotational position of the engine output shaft and the acquired engine rotational speed, determines whether the current time is in the low reaction force period.

The second embodiment described in detail above yields the following good effects in addition to the effects of the first embodiment.

A compression reaction force applied to the piston 13 varies depending on the rotational position of the crankshaft 14, and accordingly the low reaction force period can be determined on the basis of the rotational position of the crankshaft 14. Furthermore, rotational energy of the crankshaft 14 varies depending on the engine rotational speed, and when the rotational energy is considered, the low reaction force period also varies in which the reaction force applied to the piston 13 is the predetermined value or less. Thus, the compression reaction force is cancelled by the inertial force of the crankshaft 14, and accordingly the low reaction force period also varies. Therefore, on the basis of the rotational position of the crankshaft 14 and the engine rotational speed, the ECU 50 determines whether the current time is in the low reaction force period, and when it is determined that the current time is in the low reaction force period, the ECU 50 starts driving of the MG 30. This makes it possible to appropriately start the engine 11 while reducing the output torque.

Third Embodiment

The control system is not limited to the above embodiments, and for example, may be implemented as below. In the following, the same or equivalent portions of the embodiments are given the same reference numerals, and description of the portions given the same reference numerals is incorporated.

In the third embodiment, when it is determined that the crankshaft 14 is reversely rotating, after the crankshaft 14 is reversely rotated until the compression reaction force applied to the piston 13 reaches a minimum value, the ECU 50 starts driving of the MG 30.

Furthermore, in the third embodiment, the MG 30 is driven by a driving method different from that of the first embodiment. Specifically, before the low reaction force period, the ECU 50 drives the MG 30 so that an output torque is applied in a direction in which the crankshaft 14 is reversely rotated. Then, in the low reaction force period, the ECU 50 drives the MG 30 so that an output torque is applied in a direction in which the crankshaft 14 is forward rotated.

Figure 9:
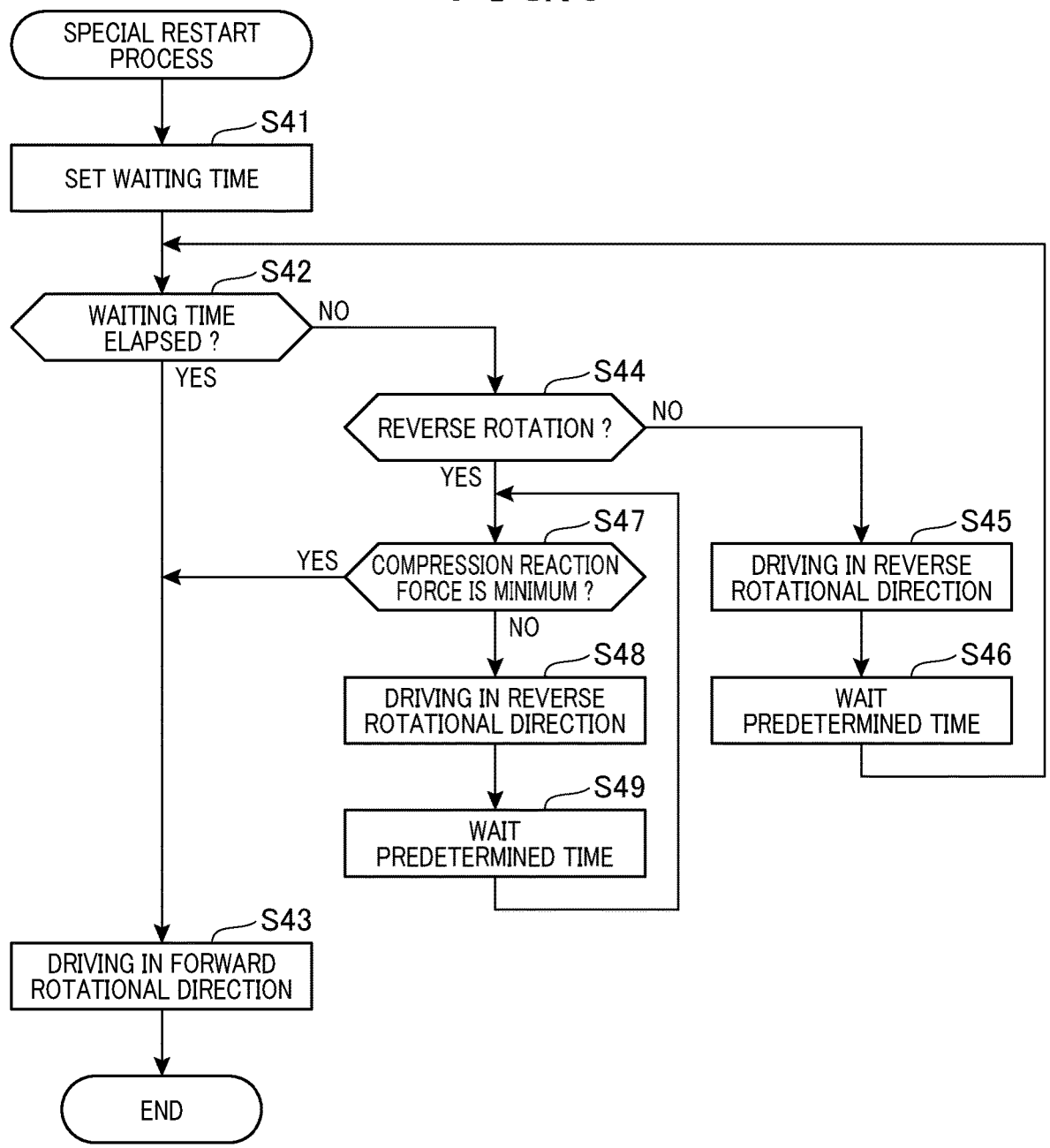
FIG. 9 is a flow chart showing a special restart process of a third embodiment.

Next, a special restart process of the third embodiment will be described with reference to FIG. 9.

The ECU 50 sets a waiting time from a time point at which the restart condition is satisfied to a time point at which the low reaction force period starts (step S41). Thus, the ECU 50 sets the waiting time corresponding to an engine rotational speed when the restart condition is satisfied (when a start request is made).

Subsequently, the ECU 50 determines whether the waiting time has elapsed (step S42). When an affirmative determination is made at step S42, the ECU 50 drives the MG 30 so that an output torque is applied in a direction in which the crankshaft 14 is forward rotated (step S43) to restart the engine 11. Then, the ECU 50 ends the special restart process.

On the other hand, when a negative determination is made at step S42, the ECU 50 determines whether the crankshaft 14 is reversely rotating (step S44). When a negative determination is made at step S44 (when the crankshaft 14 is forward rotating), the ECU 50 drives the MG 30 so that an output torque is applied in a direction in which the crankshaft 14 is reversely rotated (step S45). Subsequently, the ECU 50 waits a predetermined time (step S46), and then control proceeds to step S42.

On the other hand, when an affirmative determination is made at step S44 (when the crankshaft 14 is reversely rotating), the ECU 50 determines whether the crankshaft 14 is reversely rotated until the compression reaction force applied to the piston 13 reaches the minimum value (step S47). Specifically, the ECU 50 determines whether the rotational position is 90° C.A.

When an affirmative determination is made at step S47, the ECU 50 drives the MG 30 so that an output torque is applied in the direction in which the crankshaft 14 is forward rotated (step S43) to restart the engine 11. Then, the ECU 50 ends the special restart process.

On the other hand, when a negative determination is made at step S47, the ECU 50 drives the MG 30 so that an output torque is applied in the direction in which the crankshaft 14 is reversely rotated (step S48). Subsequently, the ECU 50 waits a predetermined time (step S49), and then control proceeds to step S47.

In the third embodiment, when it is determined that the crankshaft 14 is forward rotating, before the low reaction force period, the ECU 50 drives the MG 30 so that an output torque is applied in the direction in which the crankshaft 14 is reversely rotated. However, the ECU 50 does not need to drive the MG 30 in this manner. That is, the process at step S45 can be omitted. Furthermore, when it is determined that the crankshaft 14 is reversely rotating, before the compression reaction force applied to the piston 13 reaches the minimum value, the ECU 50 drives the MG 30 so that an output torque is applied in the direction in which the crankshaft 14 is reversely rotated. However, the ECU 50 does not need to drive the MG 30 in this manner. That is, the process at step S48 can be omitted.

Regardless of the rotation direction of the crankshaft 14, before the low reaction force period, the ECU 50 may drive the MG 30 so that an output torque is applied in the direction in which the crankshaft 14 is reversely rotated. For example, between step S41 and step S42, the ECU 50 may perform a process of driving the MG 30 so that an output torque is applied in the direction in which the crankshaft 14 is reversely rotated.

The third embodiment described in detail above yields the following good effects in addition to the effects of the first embodiment.

Figure 10:
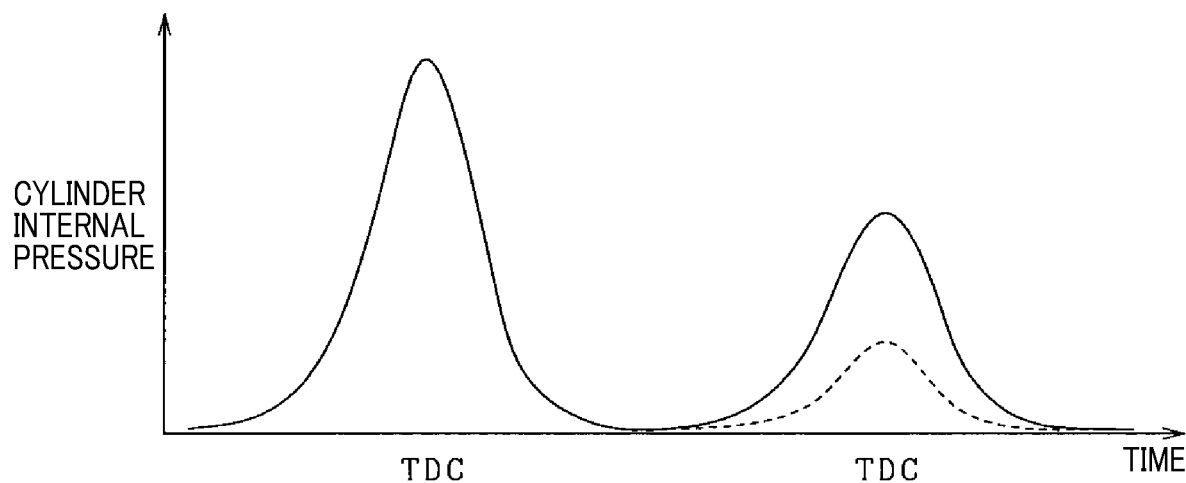
FIG. 10 is a diagram showing a change in cylinder internal pressure.

When the crankshaft 14 is forward rotating, before the low reaction force period, the ECU 50 drives the MG 30 so that an output torque is applied in the direction in which the crankshaft 14 is reversely rotated. This makes it possible to reduce the rotational energy of the crankshaft 14 (to stop the movement of the piston 13). As a result, as shown in FIG. 10, it is possible to reduce the cylinder internal pressure in the cylinder 12, and forcibly reduce the compression reaction force. In FIG. 10, a solid line indicates a change in cylinder internal pressure when the MG 30 is not driven. On the other hand, a dashed line indicates a change in cylinder internal pressure when the MG 30 is driven. Therefore, it is possible to appropriately start the engine 11 while reducing the output torque.

Even when it is determined that the crankshaft 14 is reversely rotating and that the current time is in the low reaction force period, the ECU 50 does not apply an output torque of the MG 30 in the forward rotation direction until the compression reaction force applied to the piston 13 reaches the minimum value. This makes it possible to more reliably start the engine 11.

When the crankshaft 14 is reversely rotating, the ECU 50 drives the MG 30 so that an output torque is applied in the direction in which the crankshaft 14 is reversely rotated. This makes it possible to reduce the time until the compression reaction force reaches the minimum value.

Thus, the engine 11 can be restarted at an earlier timing.

OTHER EMBODIMENTS

The present disclosure is not limited to the above embodiments, and for example, may be implemented as below. In the following, the same or equivalent portions of the embodiments are given the same reference numerals, and description of the portions given the same reference numerals is incorporated.

In the special restart process of the above embodiments, the ECU 50 may apply a field current before the low reaction force period. For example, the ECU 50 may apply a field current after the transition to the special restart process. Thus, the application of a field current before the start of driving of the MG 30 improves responsiveness when driving of the MG 30 is started. This makes it possible to more promptly start the engine 11.

In the above embodiments, the ECU 50 performs the pass determination process on the basis of the estimated data on the engine rotational speed. However, the ECU 50 may perform the pass determination process by any method. For example, the ECU 50 may perform the pass determination process on the basis of an engine rotational speed and a rotational position.

More specifically, a compression reaction force applied to the piston 13 varies depending on the rotational position of the crankshaft 14, and accordingly on the basis of the rotational position of the crankshaft 14, it possible to determine a period in which it is determined that the piston 13 can pass over the compression top dead center. Furthermore, rotational energy (inertial force) of the crankshaft 14 varies depending on the engine rotational speed, and when the rotational energy is considered, the period also varies in which it is determined that the piston 13 can pass over the compression top dead center. Thus, the compression reaction force is cancelled by the inertial force of the crankshaft 14, and accordingly the period in which it is determined that the piston 13 can pass over the compression top dead center is required to vary depending on the engine rotational speed.

Therefore, the pass determination process can be performed on the basis of a combination of the rotational position of the crankshaft 14 and the engine rotational speed. Thus, an pass determination map may be stored in the storage section, and the ECU 50 may perform the pass determination process with reference to the pass determination map. The pass determination map is used to determine, from a combination of the rotational position (BTDC) of the crankshaft 14 and the engine rotational speed, whether the piston 13 can pass over the compression top dead center. The pass determination map is set, for example, by experiment or the like.

Figure 11:
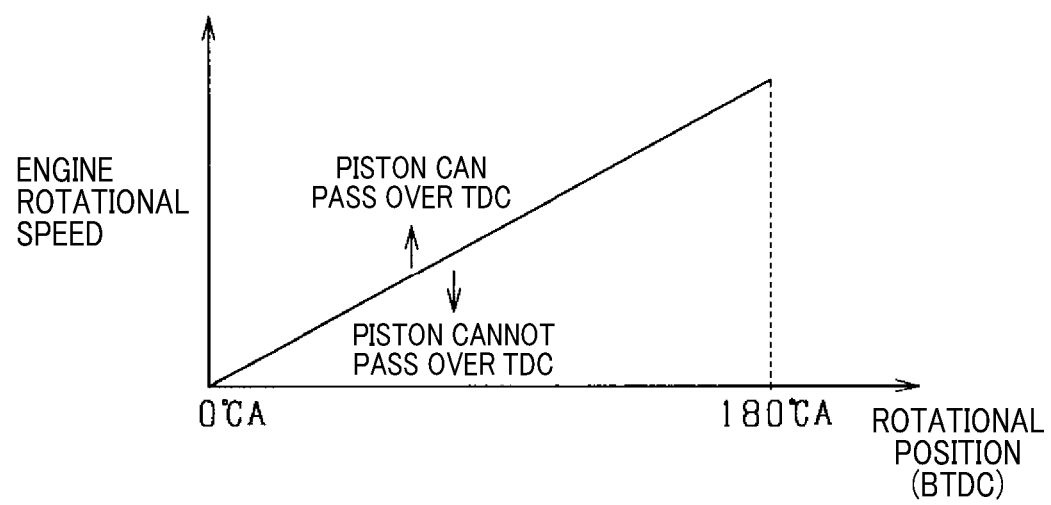
FIG. 11 is a diagram showing a pass determination map.

FIG. 11 shows an example of the pass determination map. A region above a solid line is a region in which it is determined that the piston 13 can pass over the compression top dead center, and a region below the solid line is a region in which it is determined that the piston 13 cannot pass over the compression top dead center. As shown in FIG. 11, as the engine rotational speed is increased, a range of the rotational position is increased at which it is determined that the piston 13 can pass over the compression top dead center. Furthermore, as the engine rotational speed is reduced, the rotational position at which it is determined that the piston 13 can pass over the compression top dead center becomes closer to the top dead center (0° C.A).

In the above embodiments, the SOC of the battery 35 is used as the state of the battery remaining capacity (remaining battery amount) of the battery 35. However, the present disclosure is not limited to this, and for example, an inter-terminal voltage of the battery 35 may be used.

In the above embodiments, the ECU 50 may have a function as a temperature information acquisition section that acquires temperature information on at least one of the engine 11 and the MG 30. Then, the ECU 50 may correct the low reaction force period on the basis of the acquired temperature information. Thus, a compression reaction force, an output torque of the MG 30, and the like vary depending on the temperature state of the engine 11 and the MG 30. Accordingly, considering the above points, the ECU 50 may vary the waiting time until the low reaction force period starts. This makes it possible to reliably restart the engine 11 even while reducing the output torque. Similarly, the ECU 50 may correct the pass determination process on the basis of the acquired temperature information.

In the above embodiments, the ECU 50 may acquire a battery remaining capacity (remaining battery amount) of the battery 35 and correct the low reaction force period on the basis of the battery remaining capacity. Thus, an output torque capable of being outputted by the motor varies depending on the battery remaining capacity. Therefore, on the basis of the battery remaining capacity, the ECU 50 may vary, for example, the waiting time until the low reaction force period starts. This makes it possible to reliably restart the engine 11 even while reducing the output torque. Similarly, the ECU 50 may correct the pass determination process on the basis of the acquired battery remaining capacity.

The above control performed in the rotation drop period which is the period until the engine rotational speed becomes zero is not limited to the case where the engine 11 is automatically stopped, and may be performed when the engine 11 is stopped by ignition switch operation by a driver. Furthermore, the above control may be performed when the engine 11 is stopped in a vehicle 10 having no idle stop function.

In the above embodiments, a cylinder internal pressure sensor that detects a cylinder internal pressure in the cylinder 12 may be provided, and the ECU 50 may acquire a cylinder internal pressure and determine the low reaction force period on the basis of the cylinder internal pressure or on the basis of the engine rotational speed and the cylinder internal pressure. Furthermore, the ECU 50 may perform the pass determination process on the basis of the cylinder internal pressure or on the basis of the engine rotational speed and the cylinder internal pressure.

In the above embodiments, the ECU 50 as the pass determination section 61 may perform the pass determination process on the basis of the rotation state of the crankshaft 14 and a torque capable of being outputted by the MG 30. For example, the ECU 50 may be configured such that an affirmative determination is more likely to be made in the pass determination process when the torque capable of being outputted by the MG 30 is large as compared with a case where the torque capable of being outputted by the MG 30 is small and the rotation state of the crankshaft 14 is the same. The torque capable of being outputted by the MG 30 can be calculated on the basis of a battery remaining capacity, a temperature of the MG 30, or the like.

The present disclosure has been described on the basis of the embodiments, but it is understood that the present disclosure is not limited to the embodiments or the structures. The present disclosure includes various modified examples and modifications within an equivalent range. In addition, a category or range of thought of the present disclosure encompasses various combinations or forms and other combinations or forms including only one element, one or more elements, or one or less elements of those.

What is claimed is:

1. An engine start control device that includes a motor and starts an engine using the motor in response to a start request, the motor being connectable to an engine output shaft and having power driving function, the engine start control device comprising:
   an pass determination section that performs a pass determination process of determining, based on a rotation state of the engine output shaft, whether a piston in a cylinder of the engine can pass over a compression top dead center for a rotation drop period in response to an occurrence of the start request, the rotation drop period being a period until an engine rotational speed drops to zero after combustion of the engine is stopped;
   a start control section that when it is determined that the piston cannot pass over the compression top dead center, starts driving of the motor in a low reaction force period to start the engine, the low reaction force period being a period in which a reaction force applied to the piston by a cylinder internal pressure in the cylinder is a predetermined value or less; and
   a setting section that when it is determined that the piston cannot pass over the compression top dead center, sets a waiting time from a time point at the occurrence of the start request to a time point at which the low reaction force period will start, wherein
   the start control section starts driving of the motor when the waiting time has elapsed.

2. The engine start control device according to claim 1, wherein the setting section sets the waiting time on the basis of an engine rotational speed at the time point at the occurrence of the start request.

3. An engine start control device that includes a motor and starts an engine using the motor in response to a start request, the motor being connectable to an engine output shaft and having power driving function, the engine start control device comprising:
   an pass determination section that performs a pass determination process of determining, based on a rotation state of the engine output shaft, whether a piston in a cylinder of the engine can pass over a compression top dead center for a rotation drop period in response to an occurrence of the start request, the rotation drop period being a period until an engine rotational speed drops to zero after combustion of the engine is stopped;
   a start control section that when it is determined that the piston cannot pass over the compression top dead center, starts driving of the motor in a low reaction force period to start the engine, the low reaction force period being a period in which a reaction force applied to the piston by a cylinder internal pressure in the cylinder is a predetermined value or less; and
   a period determination section that after it is determined that the piston cannot pass over the compression top dead center, acquires a rotational position of the engine output shaft and an engine rotational speed and determines, on the basis of the acquired rotational position of the engine output shaft and the acquired engine rotational speed, whether a current time is in the low reaction force period.

4. The engine start control device according to claim 1, further comprising a rotation determination section that determines whether the engine output shaft is reversely rotating, wherein when it is determined that the engine output shaft is reversely rotating, the start control section determines that a current time is in the low reaction force period, and starts driving of the motor.

5. An engine start control device that includes a motor and starts an engine using the motor in response to a start request, the motor being connectable to an engine output shaft and having power driving function, the engine start control device comprising:
   an pass determination section that performs a pass determination process of determining, based on a rotation state of the engine output shaft, whether a piston in a cylinder of the engine can pass over a compression top dead center for a rotation drop period in response to an occurrence of the start request, the rotation drop period being a period until an engine rotational speed drops to zero after combustion of the engine is stopped;
   a start control section that when it is determined that the piston cannot pass over the compression top dead center, starts driving of the motor in a low reaction force period to start the engine, the low reaction force period being a period in which a reaction force applied to the piston by a cylinder internal pressure in the cylinder is a predetermined value or less; and
   a rotation determination section that determines whether the engine output shaft is reversely rotating, wherein
   when it is determined that the engine output shaft is reversely rotating, the start control section determines that a current time is in the low reaction force period, and starts driving of the motor.

6. The engine start control device according to claim 1, further comprising:
   a storage section that stores a history of an engine rotational speed in the rotation drop period; and
   a stop estimation section that estimates the engine rotational speed on the basis of the history of the engine rotational speed stored in the storage section, wherein
   the pass determination section performs the pass determination process on the basis of the estimation by the stop estimation section.

7. An engine start control device that includes a motor and starts an engine using the motor in response to a start request, the motor being connectable to an engine output shaft and having power driving function, the engine start control device comprising:
   an pass determination section that performs a pass determination process of determining, based on a rotation state of the engine output shaft, whether a piston in a cylinder of the engine can pass over a compression top dead center for a rotation drop period in response to an occurrence of the start request, the rotation drop period being a period until an engine rotational speed drops to zero after combustion of the engine is stopped;
   a start control section that when it is determined that the piston cannot pass over the compression top dead center, starts driving of the motor in a low reaction force period to start the engine, the low reaction force period being a period in which a reaction force applied to the piston by a cylinder internal pressure in the cylinder is a predetermined value or less; and
   a storage section that stores a history of an engine rotational speed in the rotation drop period; and
   a stop estimation section that estimates the engine rotational speed on the basis of the history of the engine rotational speed stored in the storage section, wherein
   the pass determination section performs the pass determination process on the basis of the estimation by the stop estimation section.

8. The engine start control device according to claim 1, further comprising a temperature information acquisition section that acquires temperature information on at least one of the engine and the motor, wherein
   the low reaction force period is corrected on the basis of the temperature information acquired by the temperature information acquisition section.

9. An engine start control device that includes a motor and starts an engine using the motor in response to a start request, the motor being connectable to an engine output shaft and having power driving function, the engine start control device comprising:
   an pass determination section that performs a pass determination process of determining, based on a rotation state of the engine output shaft, whether a piston in a cylinder of the engine can pass over a compression top dead center for a rotation drop period in response to an occurrence of the start request, the rotation drop period being a period until an engine rotational speed drops to zero after combustion of the engine is stopped;
   a start control section that when it is determined that the piston cannot pass over the compression top dead center, starts driving of the motor in a low reaction force period to start the engine, the low reaction force period being a period in which a reaction force applied to the piston by a cylinder internal pressure in the cylinder is a predetermined value or less; and
   a temperature information acquisition section that acquires temperature information on at least one of the engine and the motor, wherein
   the low reaction force period is corrected on the basis of the temperature information acquired by the temperature information acquisition section.

10. The engine start control device according to claim 1, further comprising a remaining battery amount acquisition section that acquires a remaining battery amount of a battery that supplies electric power to the motor, wherein
   the low reaction force period is corrected on the basis of the remaining battery amount acquired by the remaining battery amount acquisition section.

11. An engine start control device that includes a motor and starts an engine using the motor in response to a start request, the motor being connectable to an engine output shaft and having power driving function, the engine start control device comprising:
   an pass determination section that performs a pass determination process of determining, based on a rotation state of the engine output shaft, whether a piston in a cylinder of the engine can pass over a compression top dead center for a rotation drop period in response to an occurrence of the start request, the rotation drop period being a period until an engine rotational speed drops to zero after combustion of the engine is stopped;
   a start control section that when it is determined that the piston cannot pass over the compression top dead center, starts driving of the motor in a low reaction force period to start the engine, the low reaction force period being a period in which a reaction force applied to the piston by a cylinder internal pressure in the cylinder is a predetermined value or less; and a remaining battery amount acquisition section that acquires a remaining battery amount of a battery that supplies electric power to the motor, wherein the low reaction force period is corrected on the basis of the remaining battery amount acquired by the remaining battery amount acquisition section.

12. The engine start control device according to claim 1, wherein the start control section is configured to drive the motor, before the low reaction force period, to apply a first output torque of the motor to the engine output shaft in a reverse rotational direction of the engine output shaft; and drive the motor, during the low reaction force period, to apply a second output torque of the motor to the engine output shaft in a forward rotational direction of the engine output shaft.

13. The engine start control device according to claim 1, further comprising a rotation determination section that determines whether the engine output shaft is reversely rotating, wherein when it is determined that the engine output shaft is reversely rotating, after the engine output shaft is reversely rotated until a compression reaction force applied to the piston reaches a minimum value, the start control section starts driving of the motor.

14. The engine start control device according to claim 13, wherein in a case where it is determined that the engine output shaft is reversely rotating, the start control section is configured to:

drive the motor, before the compression reaction force reaches the minimum value, to apply a third output torque of the motor to the engine output shaft in a reverse rotational direction of the engine output shaft; and drive the motor, after the compression reaction force reaches the minimum value, to apply a fourth output torque of the motor to the engine output shaft in a forward rotational direction of the engine output shaft.

15. The engine start control device according to claim 1, wherein the start control section applies a field current before the low reaction force period.

16. The engine start control device according to claim 1, wherein the pass determination section performs the pass determination process on the basis of the rotation state of the engine output shaft and a torque capable of being outputted by the motor.

* * * * *